(12) United States Patent
Hamidifar et al.

(10) Patent No.: US 10,735,897 B2
(45) Date of Patent: Aug. 4, 2020

(54) METHOD AND SYSTEM FOR EMBEDDED DEVICE LOCALIZATION-BASED FAULT INDICATION

(71) Applicant: MAPSTED CORP., Mississauga (CA)

(72) Inventors: Saeedeh Hamidifar, Mississauga (CA); Paramvir Singh Nagpal, Brampton (CA)

(73) Assignee: MAPSTED CORP., Mississauga, Ontario (CA)

( * ) Notice: Subject to any disclaimer, the term of this patent is extended or adjusted under 35 U.S.C. 154(b) by 0 days.

(21) Appl. No.: 16/123,048

(22) Filed: Sep. 6, 2018

(65) Prior Publication Data
US 2020/0084573 A1    Mar. 12, 2020

(51) Int. Cl.
| | | |
|---|---|---|
| *H04W 4/02* | (2018.01) | |
| *G06F 17/18* | (2006.01) | |
| *G01S 5/02* | (2010.01) | |
| *H04L 12/26* | (2006.01) | |
| *H04L 12/24* | (2006.01) | |

(52) U.S. Cl.
CPC ........... *H04W 4/023* (2013.01); *G01S 5/0284* (2013.01); *G06F 17/18* (2013.01); *H04L 41/065* (2013.01); *H04L 43/04* (2013.01); *H04L 43/0811* (2013.01)

(58) Field of Classification Search
CPC .... H04W 4/023; G01S 5/0284; H04L 41/065; H04L 43/04; H04L 43/0811; G06F 17/18
See application file for complete search history.

(56) References Cited

U.S. PATENT DOCUMENTS

| | | | |
|---|---|---|---|
| 5,920,261 A | * | 7/1999 | Hughes ................. G01S 13/878 340/3.51 |
| 2008/0186234 A1 | * | 8/2008 | Alles ....................... G01S 5/021 342/451 |
| 2009/0043504 A1 | | 2/2009 | Bandyopadhyay et al. |
| 2014/0304123 A1 | | 10/2014 | Schwartz |
| 2015/0310348 A1 | * | 10/2015 | Dessouky .............. G06N 7/005 706/52 |
| 2016/0295356 A1 | * | 10/2016 | Schoner ............ G06K 7/10366 |
| 2016/0379074 A1 | | 12/2016 | Nielsen et al. |
| 2017/0324761 A1 | * | 11/2017 | Dekel ................. H04L 63/1425 |
| 2017/0337528 A1 | * | 11/2017 | Hall ....................... G06Q 20/10 |
| 2018/0206078 A1 | * | 7/2018 | Venkatraman ........ H04W 4/043 |

* cited by examiner

*Primary Examiner* — Wayne H Cai

(57) ABSTRACT

A method and system of signaling an anomaly state associated with a host asset device. The method, executed in a processor of a server computing device, comprises detecting, using one or more sensors, movement of an embedded device, the embedded device placed within the host asset device in an indoor facility, localizing the embedded device, determining, based on the localizing, that a position of the host asset device is substantially identical to a known nominal position of the embedded device, and signaling, based on the determining, that an anomaly state is associated with the host asset device.

18 Claims, 3 Drawing Sheets

METHOD AND SYSTEM FOR EMBEDDED DEVICE LOCALIZATION-BASED FAULT INDICATION

TECHNICAL FIELD

The disclosure herein relates to the field of localization of embedded computing and communication devices.

BACKGROUND

A manufacturer may commonly deploy assets within a factory floor, or similar indoor facility, for use in manufacturing processes. Asset devices, such as manufacturing tooling molds, although deployed in operation only intermittently and upon demand, but need to be readily available for rapid deployment and operational use in a fully functional state.

DETAILED DESCRIPTION

Figure 1:
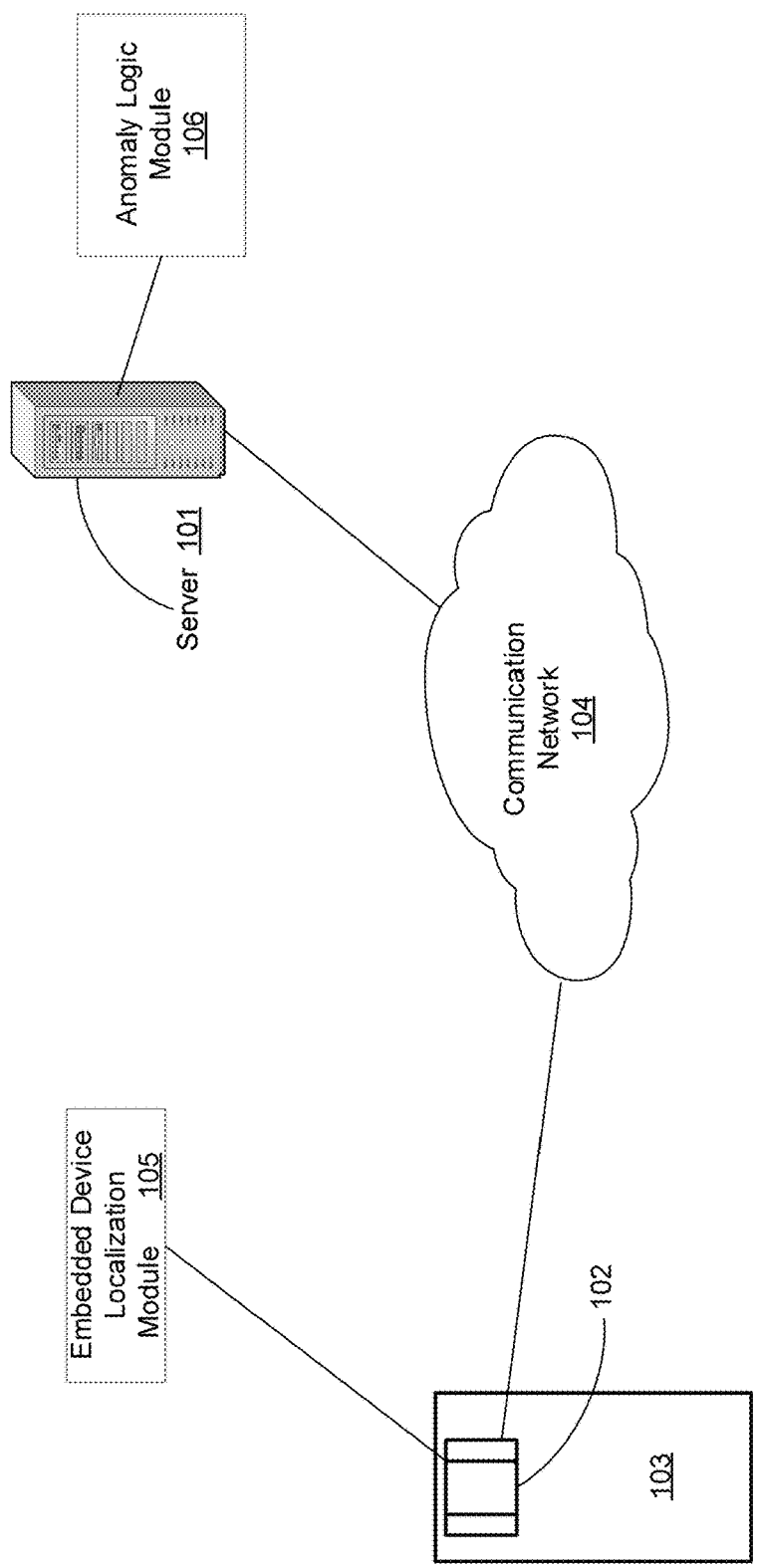
FIG. 1 illustrates, in an example embodiment, a localization-based system for signaling existence of an anomaly state associated with a host asset device.

Movable assets on a manufacturing facility floor that are deployed in operation only intermittently on an as-needed basis may be unavailable for operational deployment upon demand due to malfunctions that arise between periods in operation. Among other benefits, the disclosure herein allows rapid reporting and identification of asset devices that might become inoperative due to malfunction, and increases likelihood that the device is available for operation upon demand without further downtime or delay due to unreported or unidentified states of malfunction.

Provided is a method of signaling an anomaly state associated with a host asset device. The method, executed in a processor of a server computing device, comprises detecting, using one or more sensors, movement of an embedded device, the embedded device placed within the host asset device in an indoor facility, localizing the embedded device, determining, based on the localizing, that a position of the host asset device is substantially identical to a known nominal position of the embedded device, and signaling, based on the determining, that an anomaly state is associated with the host asset device.

Also provided is a server computing system for signaling an anomaly state of a host asset device. The server computing system comprises a processor and a memory, the memory including instructions executable in the processor to detect, using one or more sensors, movement of an embedded device, the embedded device placed within the host asset device in an indoor facility, localize the embedded device, determine, based on the localizing, that a position of the host asset device is substantially identical to a known nominal position of the embedded device, and signal, based on the determining, that the anomaly state is associated with the host asset device.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame.

The pedestrian route, in embodiments, may encompass an indoor area within any one or a combination of a manufacturing facility, a shopping mall, a warehouse, an airport facility, a hospital facility, a university campus facility or any at least partially enclosed building. The term pedestrian as used herein is intended not encompass not only walking pedestrians, but also users of mobile phones moving at typical pedestrian speeds, for example at less than 10 miles per hour using automated means within the pedestrian area, including but not limited to automated wheelchairs or automated people-moving indoor carts.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). An embedded device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, localization-based system 100 for progressively locating embedded communication and computing device 102, also referred to herein as embedded device 102. Embedded device 102 may include a processor, memory and associated circuitry to accomplish any one or more of telephony, data communication, and data computing. Embedded device 102 may be fixedly or removably hosted within host asset device 103, which in one embodiment may be a manufacturing tooling mold deployed in a manufacturing facility. Embedded device 102 may include fingerprint data of a surrounding or proximate pedestrian area, such as a factory manufactory floor or multiple floors, stored in local memory. In other variations, embedded device 102 may be connected within a computer network communication system, including the internet or other wide area network, to remote server computing device 101 storing the fingerprint data of the pedestrian area, the latter being communicatively accessible to embedded device 102 for download of the fingerprint data.

A pedestrian navigation, or indoor positioning, software application may be downloaded and installed, or stored, in a memory of embedded device 102 and further include a physical layout map of a manufacturing facility or building. In one embodiment, the pedestrian navigation software application may incorporate one or more portions of processor-executable instructions manifesting embedded device localization module 105. The terms localize or localization as used herein refer to determining an estimated coordinate position (x, y, z) along a pedestrian route or trajectory being traversed in accompaniment of embedded device 102.

Embedded device 102 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Embedded device 102 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Embedded device 102 further includes the capability for detecting, via sensor devices, and measuring a received signal strength, and of determining signal connectivity parameters, related to the ambient wireless signals. In particular, embedded device 102 may include location determination capability such as by way of a GPS module having a GPS receiver, and a communication interface for communicatively coupling to communication network 104, including by sending and receiving cellular data over data and voice channels.

A fingerprint data repository, or any portion(s) thereof, may be stored in server computing device 101 (also referred to herein as server 101) and made communicatively accessible to embedded device 102 via communication network 104. Server 101 may include progressive locator logic module 106 comprised of instructions executable in a processor of server device 101. In some embodiments, it is contemplated that the fingerprint data repository, or any portions of data and processor-executable instructions constituting the fingerprint data repository, may be downloaded for storage, at least temporarily, within a memory of embedded device 102. In embodiments, the fingerprint map data stored in the fingerprint data repository further associates particular positions along pedestrian route of the manufacturing facility or indoor area with a particular combination of time-stamped fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, time-stamped individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility in accordance with a particular time stamp of gathering the set of mobile sensor data by time correlating the mobile device gyroscope data, the mobile device accelerometer data, mobile device magnetometer data and any other applicable mobile device sensor data, for example. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101. Server 101 may store respective fingerprint maps of various buildings and indoor areas. The respective building or indoor facility fingerprint maps, or any portions thereof, may be downloaded into a memory of embedded device 102 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by embedded device 102, whereupon the fingerprint or signature as detected may be matched to a reference fingerprint, or a reference pattern including a set of fingerprints, in a stored fingerprint map of a given facility made accessible to embedded device localization module 105 to identify a unique position of embedded device 102 along a pedestrian route. As used herein, term signal connectivity, as distinguished from a signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of embedded device 102 along a sequence of positions that constitute a pedestrian route within, and even adjoining, the indoor facility.

Embedded device localization module 105, constituted of logic instructions executable in a processor of embedded device 102 in one embodiment, may be hosted at embedded device 102 and provides, at least in part, capability for localizing embedded device 102 along a pedestrian route traversed in an indoor area such as a given floor of a multi-floor manufacturing facility, in one embodiment. In alternate embodiments, one or more portions constituting embedded device localization module 105 may be hosted remotely at a server device and made communicatively accessible to embedded device 102 via communication network 104.

Host asset device 103, which in an embodiment may be a manufacturing mold tooling or similar asset, may include user interface features or indicators, for instance, including but not limited to visible display(s) and audible alert capability. The user interface features may be controlled by a processor of embedded device 102, or alternately a local processor within host asset device 103 that is communicatively coupled to the processor of embedded device 102. The visible display may include liquid crystal display devices and light emitting diode devices of one or more colors. The audible alerts may be generated in varying audible volume and at varying intermittencies.

Figure 2:
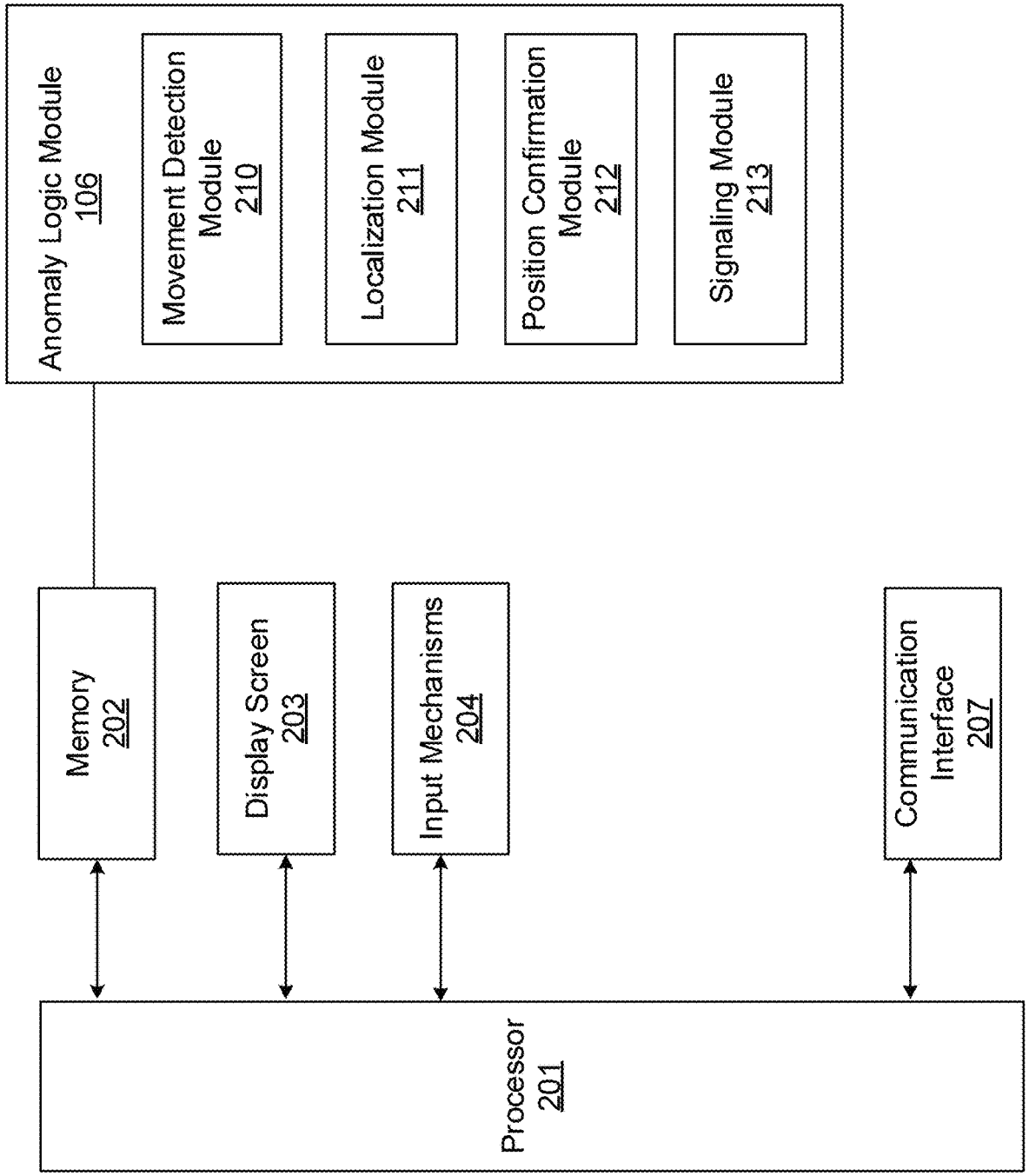
FIG. 2 illustrates, in one example embodiment, an architecture of a server computer in a localization-based system for signaling existence of an anomaly state associated with a host asset device.

FIG. 2 illustrates, in one example embodiment, architecture 200 of a server computer in a localization-based system for progressively locating an embedded communication device. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1 through 3 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with embedded device 102.

Embedded device localization module 105 of embedded device 102 includes instructions stored in memory 202 of embedded device 102, the instructions being executable in a processor of embedded device 102. In alternate embodiments, it is contemplated that any one or more or portions of embedded device localization module 105 may be located at remote server device 101 communicatively accessible to mobile devices 102a-n via network communication interface 207.

Progressive locator logic module 106 of server 101 may include executable instructions comprising sub-modules location request module 210, localization module 211, proximity module 212 and progressive indicator module 213.

Processor 201 uses executable instructions of location request module 210 to detect, using one or more sensors, movement of embedded device 102, embedded device 102 placed within host asset device 103 in an indoor facility.

Processor 201, in conjunction with embedded device localization module 105 in an embodiment, uses executable instructions stored in localization module 211 to localize embedded device 102.

Processor 201 uses executable instructions stored in proximity module 212 to determine, based on the localizing, that a position of host asset device 103 is substantially identical to a known or expected nominal position of the embedded device 102.

Processor 201 uses executable instructions stored in progressive indicator module 213 to signal, based on the determining, that an anomaly state is associated with the host asset device.

Methodology

Figure 3:
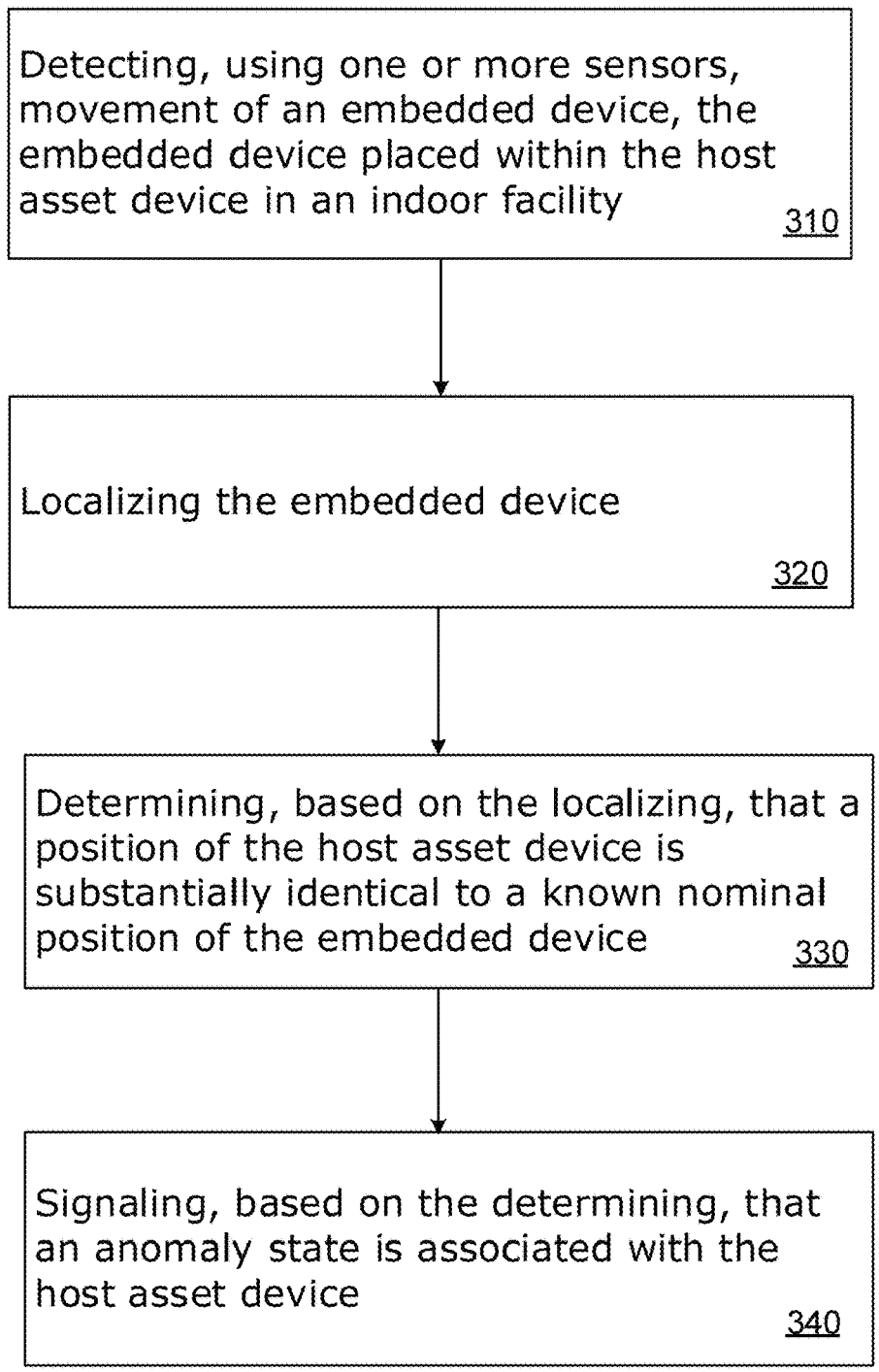
FIG. 3 illustrates an example embodiment localization-based method of signaling existence of an anomaly state associated with a host asset device.

FIG. 3 illustrates an example embodiment 300 localization-based method of progressively locating embedded device 102 in place within host asset device 103. In describing examples of FIG. 3, reference is made to the examples of FIGS. 1-2 for purposes of illustrating suitable components or elements for performing a step or sub-step being described.

Examples of method steps described herein relate to the use of embedded device 102 for implementing the techniques described. According to one embodiment, the techniques are performed by embedded device localization module 105 of embedded device 102 in response to execution of one or more sequences of software logic instructions that constitute embedded device localization module 105. In embodiments, progressive locator logic module 106 may include the one or more sequences of instructions within any one or more, or parts, of sub-modules including location request module 210, and localization module 211, proximity module 212 and progressive indicator module 213. Such instructions may be read into memory 202 of server 101 from machine-readable medium, such as memory storage devices, or downloaded into memory 202 via network communication interface 207. In executing the sequences of instructions of location request module 210, localization module 211, proximity module 212 and progressive indicator module 213 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between embedded device 102 and remote but communicatively accessible server computing device 101.

At step 310, processor 201 executes instructions included in location request module 210 to receive a request for locating embedded device 102 hosted within host asset device 103. In one embodiment, inertial sensors of embedded device 102 detect movement, and embedded device 102 may be removably or fixedly placed within host asset device 102.

At step 320, processor 201 executes instructions included in localization module 211 to generate, using the processor, a request for localizing embedded device 102. The localizing may comprise location coordinate information and floor number information for embedded device 102 within a multi-floor manufacturing facility or building. The localizing may be based on at least one of a magnetic field strength and direction, a received wireless communication signal strength, a wireless connectivity indication and a barometric pressure in accordance with fingerprint data of the multi-floor building. The fingerprint data may include respective time-stamps whereby the magnetic field strength and direction, the received wireless signal strength, the wireless connectivity indication and the barometric pressure are the localizing comprises location coordinate information and floor number information for the embedded device within a multi-floor building.

In one embodiment, a probabilistic confidence level may be associated with localizing embedded device 102. In an embodiment, the localizing comprises a coordinate location having a probabilistic estimate expressed as a confidence level. A confidence level indicative of a degree of accuracy for the localized position of embedded device 102 may be determined, given that the accuracy associated with estimating the position, or location, of a embedded device 102 as a consequence of localization is not absolute, but rather is subject to the statistical, or probabilistic, nature of the fingerprint parameters, including but not limited to the inherently probabilistic nature of wireless radio frequency signal parameters as received. In some embodiments, a degree of accuracy associated with the position estimation may be indicated by a confidence level that is determined for, and assigned in conjunction with, estimated first and second positions as localized. As a measure of the accuracy of localization of embedded device 102, the confidence level associated with the location estimate may be obtained by fusing the probabilistic results of multiple concurrent location estimates. In some embodiments, the variance in the x and y components, with respect to their mean values ($\mu_x$, $\mu_y$), can be estimated independently as:

$$\sigma_x^2 = \frac{1}{N-1} \sum (x - \mu_x)^2$$

$$\sigma_y^2 = \frac{1}{N-1} \sum (y - \mu_y)^2$$

and combined to produce the confidence level. In one embodiment, the overall confidence level can be selected as a function of the maximum standard deviation of the x-y components, as $\sigma = \max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the location estimate increases. Conversely, if several distinct per-group probabilities are similar, then the confidence in the per-group results are reduced, leading to a lower confidence level. Thus, the estimated position, or position as localized, comprises a probabilistic estimate expressed as a confidence level.

At step 330, processor 201 of server 101 executes instructions included in proximity module 212 to determine, based on the localizing, that a position of host asset device 103 is substantially identical to a known nominal position of embedded device 102, for instance, a last known position of embedded device 102 when host device 103 was last deployed in operation. In an embodiment, substantially identical may be less than a threshold distance of one meter from the last known nominal position.

At step 340, processor 201 of server 101 executes instructions included in signaling module 213 to initiate signaling, by embedded device 102, upon detecting that a malfunction or operational anomaly exists at host asset device 103 or embedded device 102. In embodiments, the anomaly state may be a fault condition of one or more inertial or other sensors, a fault condition of embedded device 102, or an unauthorized movement of host access device 103.

In one embodiment, the signaling further comprises varyingly operating at least one user interface indicator of the host asset device until the anomaly state is one of nullified and rectified. The signaling may include operating one or more user interface indicators, in one embodiment a user interface indicator within host access device 103, in response to detecting the malfunction or operational anomaly state.

In one variation, the signaling is initiated and performed only if the confidence level associated with localization of embedded device 102 or host asset device 103 exceeds 70 percent.

In another embodiment, the signaling may incorporate one or more of an audible and a visible indicator at host asset device 103. The visible indicators may be a set of LED lights operated to pulse at higher and higher rates, or changing in colors, thereby to draw attention to the particular tooling mold device that may need maintenance or service attention. The audible indicator may an audible alert, operated at varyingly higher audible pitch levels, in an embodiment, at host asset device 103.

In another variation, the audible and visible indicators may only be operated once embedded device 102 is localized with some threshold level of confidence, for instance, only if the confidence level of the localization for embedded device 102 and host asset device 103 exceeds 70 percent.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method, executed in a processor of a server computing device, of signaling an anomaly state associated with a host asset device, the method comprising:
   detecting, using one or more sensors of an embedded device, movement of the embedded device in an indoor facility, the embedded device placed within the host asset device in the indoor facility, the one or more sensors including inertial sensors;
   localizing the embedded device based on fingerprint data of the indoor facility and sensor data received from the embedded device, the embedded device including the fingerprint data in conjunction with a physical layout of the indoor facility, the localizing including determining a confidence level associated with a location estimate by fusing probabilistic results of multiple concurrent location estimates of the embedded device in the indoor facility;

determining, based on the localizing, that a position of the host asset device is substantially identical to a known nominal position of the embedded device;

ascertaining whether the confidence level associated with the location estimate is greater than a threshold confidence level; and signaling, based on the determining and ascertaining that the confidence level is greater than the threshold confidence level, that an anomaly state is associated with the host asset device, wherein the anomaly state comprises at least one of a fault condition of the one or more sensors and a fault condition of the embedded device.

2. The method of claim 1 wherein the one or more sensors further comprise signal sensors, and the embedded device is one of removably and fixedly placed within the host asset device.

3. The method of claim 1 wherein the anomaly state comprises an unauthorized movement of the host access device.

4. The method of claim 3 wherein substantially identical comprises less than a threshold distance of one meter from the known nominal position.

5. The method of claim 4 wherein the signaling further comprises varyingly operating at least one user interface indicator of the host asset device until the anomaly state is one of nullified and rectified.

6. The method of claim 1 wherein the localizing comprises location coordinate information and floor number information for the embedded device within a multi-floor building.

7. The method of claim 1 wherein the localizing is based on at least one of a magnetic field strength and direction, a received wireless communication signal strength, a wireless connectivity indication and a barometric pressure in accordance with fingerprint data of the multi-floor building.

8. The method of claim 7 wherein the fingerprint data includes time-stamps whereby the magnetic field strength and direction, the received wireless signal strength, the wireless connectivity indication and the barometric pressure are time-correlated based on the time-stamps.

9. The method of claim 1, wherein threshold confidence level indicates a 70 percent accuracy.

10. A server computing system for signaling an anomaly state of a host asset device, the server computing system comprising:
   a processor; and
   a memory including instructions executable in the processor to:
      detect, using one or more sensors of an embedded device, movement of the embedded device in an indoor facility, the embedded device placed within the host asset device in the indoor facility, the one or more sensors including inertial sensors;
      localize the embedded device, the localizing including determining a confidence level associated with a location estimate by fusing probabilistic results of multiple concurrent location estimates of the embedded device in the indoor facility;
      determine, based on the localizing, that a position of the host asset device is substantially identical to a known nominal position of the embedded device;
      ascertaining whether the confidence level associated with the location estimate is greater than a threshold confidence level; and
      signal, based on the determining and ascertaining that the confidence level is greater than the threshold confidence level, that the anomaly state is associated with the host asset device, wherein the anomaly state comprises at least one of a fault condition of the one or more sensors and a fault condition of the embedded device.

11. The server computing system of claim 10 wherein the one or more sensors further comprise signal sensors, and the embedded device is one of removably and fixedly hosted within the host asset device.

12. The server computing system of claim 10 wherein the anomaly state comprises an unauthorized movement of the host access device.

13. The server computing system of claim 12 wherein substantially identical comprises less than a threshold distance of one meter from the known nominal position.

14. The server computing system of claim 13 wherein the signaling further comprises varyingly operating at least one user interface indicator of the host asset device until the anomaly state is one of nullified and rectified.

15. The server computing system of claim 10 wherein the localizing comprises location coordinate information and floor number information for the embedded device within a multi-floor building.

16. The server computing system of claim 10 wherein the localizing is based on at least one of a magnetic field strength and direction, a received wireless communication signal strength, a wireless connectivity indication and a barometric pressure in accordance with fingerprint data of the multi-floor building.

17. The server computing system of claim 16 wherein the fingerprint data includes time-stamps whereby the magnetic field strength and direction, the received wireless signal strength, the wireless connectivity indication and the barometric pressure are time-correlated based on the time-stamps.

18. The server computing system of claim 10, wherein threshold confidence level indicates a 70 percent accuracy.

* * * * *